United States Patent
Risney, Jr. et al.

(10) Patent No.: US 9,858,247 B2
(45) Date of Patent: Jan. 2, 2018

(54) RUNTIME RESOLUTION OF CONTENT REFERENCES

(71) Applicant: Microsoft Technology Licensing, LLC, Redmond, WA (US)

(72) Inventors: David L Risney, Jr., Redmond, WA (US); Bradley J Peters, Kirkland, WA (US); Scott B Graham, Seattle, WA (US); Lindsay D Verola, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 268 days.

(21) Appl. No.: 13/898,432

(22) Filed: May 20, 2013

(65) Prior Publication Data

US 2014/0344667 A1    Nov. 20, 2014

(51) Int. Cl.
| | | |
|---|---|---|
| *G06F 15/00* | (2006.01) | |
| *G06F 17/22* | (2006.01) | |
| *G06F 17/30* | (2006.01) | |
| *G06F 21/10* | (2013.01) | |

(52) U.S. Cl.
CPC .... *G06F 17/2229* (2013.01); *G06F 17/30905* (2013.01); *G06F 21/10* (2013.01)

(58) Field of Classification Search
CPC .......... G06F 17/2247; G06F 17/30905; G06F 17/727; G06F 17/3089; G06F 17/30893; G06F 17/2229; G06F 21/10
USPC ....................................................... 715/234
See application file for complete search history.

(56) References Cited

U.S. PATENT DOCUMENTS

| | | | |
|---|---|---|---|
| 5,721,824 A | 2/1998 | Taylor | |
| 5,974,549 A | 10/1999 | Golan | |
| 6,052,120 A * | 4/2000 | Nahi et al. | ..................... 715/700 |
| 6,101,607 A | 8/2000 | Bachand et al. | |

(Continued)

FOREIGN PATENT DOCUMENTS

| | | |
|---|---|---|
| CN | 1582430 | 2/2005 |
| CN | 1617101 | 5/2005 |

(Continued)

OTHER PUBLICATIONS

"Final Office Action", U.S. Appl. No. 13/228,695, dated Sep. 22, 2014, 12 pages.

(Continued)

*Primary Examiner* — Scott Baderman
*Assistant Examiner* — Hassan Mrabi (57) ABSTRACT

A computing device includes a view control that manages presentation of electronic content on the computing device. The presentation can include displaying content, audibly playing back content, and so forth. The view control is made available to multiple different applications on the computing device. To use the view control, an application provides to the view control an indication of a resolver for the view control to use. The electronic document includes references to electronic content, and the view control requests the referenced electronic content from the resolver. The resolver obtains the referenced electronic content, decodes (e.g., decompresses, decrypts, etc.) the obtained electronic content, and returns the decoded electronic content to the view control for display or other presentation.

20 Claims, 6 Drawing Sheets

(56) References Cited

U.S. PATENT DOCUMENTS

| | | |
|---|---|---|
| 6,117,187 A | 9/2000 | Staelin |
| 6,151,643 A | 11/2000 | Cheng et al. |
| 6,173,316 B1 * | 1/2001 | De Boor ......... H04M 1/274558 |
| | | 707/999.009 |
| 6,279,111 B1 | 8/2001 | Jensenworth et al. |
| 6,308,173 B1 | 10/2001 | Glasser et al. |
| 6,366,617 B1 * | 4/2002 | Ryan .................... H04N 19/00 |
| | | 375/240.25 |
| 6,367,012 B1 | 4/2002 | Atkinson et al. |
| 6,378,071 B1 | 4/2002 | Sasaki et al. |
| 6,522,694 B1 * | 2/2003 | Ryan .................... H04N 19/00 |
| | | 375/240.25 |
| 6,604,209 B1 | 8/2003 | Grucci et al. |
| 6,697,569 B1 | 2/2004 | Gomez et al. |
| 6,725,452 B1 | 4/2004 | Te'eni et al. |
| 6,865,659 B2 | 3/2005 | Montemayor |
| 7,031,276 B2 | 4/2006 | Inoue |
| 7,069,330 B1 | 6/2006 | McArdle et al. |
| 7,151,832 B1 | 12/2006 | Fetkovich et al. |
| 7,152,243 B2 | 12/2006 | Bourne et al. |
| 7,337,442 B2 | 2/2008 | VoBa et al. |
| 7,392,383 B2 | 6/2008 | Basibes et al. |
| 7,398,532 B1 | 7/2008 | Barber et al. |
| 7,401,235 B2 | 7/2008 | Mowers et al. |
| 7,472,377 B2 | 12/2008 | Anand et al. |
| 7,475,396 B2 | 1/2009 | Kapoor |
| 7,478,094 B2 | 1/2009 | Ho et al. |
| 7,542,988 B1 | 6/2009 | Cook et al. |
| 7,607,131 B2 | 10/2009 | Oe et al. |
| 7,650,501 B1 | 1/2010 | Brunette, Jr. et al. |
| 7,650,627 B1 | 1/2010 | Stancheva et al. |
| 7,664,924 B2 | 2/2010 | Safa |
| 7,698,393 B2 | 4/2010 | Milstein et al. |
| 7,716,734 B2 | 5/2010 | Birrell et al. |
| 7,774,753 B1 | 8/2010 | Reilly et al. |
| 7,779,265 B2 | 8/2010 | Dubhashi et al. |
| 7,818,456 B2 * | 10/2010 | Carro .................... G06Q 10/107 |
| | | 707/E17.002 |
| 7,925,875 B2 | 4/2011 | McAvoy |
| 7,934,087 B2 | 4/2011 | Carter |
| 8,001,528 B2 | 8/2011 | Bernabeu-Auban et al. |
| 8,073,442 B2 | 12/2011 | Frank et al. |
| 8,185,889 B2 | 5/2012 | Kinder et al. |
| 8,315,620 B1 | 11/2012 | Williamson et al. |
| 8,327,441 B2 | 12/2012 | Kumar et al. |
| 8,468,608 B1 | 6/2013 | Hernacki et al. |
| 8,838,982 B2 | 9/2014 | Carlson et al. |
| 8,990,561 B2 | 3/2015 | Sheehan et al. |
| 9,679,130 B2 | 6/2017 | Sheehan et al. |
| 2001/0029605 A1 | 10/2001 | Forbes et al. |
| 2003/0009491 A1 * | 1/2003 | Kanai ............................ 707/500 |
| 2003/0084134 A1 | 5/2003 | Pace et al. |
| 2003/0229900 A1 * | 12/2003 | Reisman ........... G06F 17/30873 |
| | | 725/87 |
| 2004/0030926 A1 | 2/2004 | Clark |
| 2004/0039924 A1 | 2/2004 | Baldwin et al. |
| 2004/0148514 A1 | 7/2004 | Fee et al. |
| 2004/0181557 A1 | 9/2004 | Orbitz et al. |
| 2004/0193606 A1 | 9/2004 | Arai et al. |
| 2004/0199787 A1 | 10/2004 | Hans et al. |
| 2005/0071641 A1 | 3/2005 | Basibes et al. |
| 2005/0091535 A1 | 4/2005 | Kavalam et al. |
| 2005/0091658 A1 | 4/2005 | Kavalam et al. |
| 2005/0132350 A1 | 6/2005 | Markley et al. |
| 2005/0154738 A1 | 7/2005 | Thomas et al. |
| 2005/0246762 A1 | 11/2005 | Girouard et al. |
| 2005/0256859 A1 | 11/2005 | Keohane et al. |
| 2005/0273841 A1 | 12/2005 | Freund |
| 2005/0289348 A1 | 12/2005 | Joy et al. |
| 2006/0048129 A1 | 3/2006 | Napier et al. |
| 2006/0080546 A1 | 4/2006 | Brannon et al. |
| 2006/0155986 A1 | 7/2006 | Kleinhuis et al. |
| 2006/0174252 A1 | 8/2006 | Besbris et al. |
| 2006/0193467 A1 | 8/2006 | Levin |
| 2006/0259606 A1 | 11/2006 | Rogers et al. |
| 2006/0259980 A1 | 11/2006 | Field et al. |
| 2007/0005734 A1 * | 1/2007 | Abdo .................... H04L 63/0227 |
| | | 709/219 |
| 2007/0027872 A1 | 2/2007 | Johnson et al. |
| 2007/0083655 A1 | 4/2007 | Pedersen |
| 2007/0146777 A1 * | 6/2007 | Cranitch ............... H04L 12/5835 |
| | | 358/1.15 |
| 2007/0157287 A1 | 7/2007 | Lim |
| 2007/0157302 A1 | 7/2007 | Ottamalika et al. |
| 2007/0192500 A1 | 8/2007 | Lum |
| 2007/0208857 A1 | 9/2007 | Danner et al. |
| 2007/0234412 A1 | 10/2007 | Smith et al. |
| 2007/0239981 A1 | 10/2007 | Lessing |
| 2007/0240194 A1 | 10/2007 | Hargrave et al. |
| 2008/0074707 A1 * | 3/2008 | Cranitch ............... H04N 1/00209 |
| | | 358/403 |
| 2008/0092133 A1 | 4/2008 | Mantere |
| 2008/0120707 A1 | 5/2008 | Ramia |
| 2008/0162698 A1 | 7/2008 | Hopen et al. |
| 2008/0201705 A1 | 8/2008 | Wookey |
| 2008/0220878 A1 | 9/2008 | Michaelis |
| 2008/0244723 A1 | 10/2008 | Brewster et al. |
| 2008/0282354 A1 | 11/2008 | Wobber et al. |
| 2008/0307491 A1 | 12/2008 | Duri et al. |
| 2009/0022325 A1 | 1/2009 | Naedele |
| 2009/0100421 A1 | 4/2009 | Flaming et al. |
| 2009/0113528 A1 | 4/2009 | Ananda et al. |
| 2009/0144659 A1 | 6/2009 | Do |
| 2009/0170431 A1 | 7/2009 | Pering et al. |
| 2009/0187772 A1 | 7/2009 | Lange et al. |
| 2009/0193507 A1 | 7/2009 | Ibrahim |
| 2009/0222659 A1 | 9/2009 | Miyabayashi |
| 2009/0222894 A1 | 9/2009 | Kenny et al. |
| 2009/0249283 A1 | 10/2009 | Bourdon |
| 2009/0249436 A1 | 10/2009 | Coles et al. |
| 2009/0307360 A1 | 12/2009 | Ianchici et al. |
| 2009/0307684 A1 | 12/2009 | Best et al. |
| 2009/0312093 A1 | 12/2009 | Walker et al. |
| 2009/0319673 A1 | 12/2009 | Peters |
| 2009/0327900 A1 | 12/2009 | Noll et al. |
| 2009/0328180 A1 | 12/2009 | Coles et al. |
| 2010/0037216 A1 | 2/2010 | Carcerano et al. |
| 2010/0058320 A1 | 3/2010 | Milligan et al. |
| 2010/0081375 A1 | 4/2010 | Rosenblatt |
| 2010/0107215 A1 | 4/2010 | Bechtel et al. |
| 2010/0153671 A1 | 6/2010 | Safa |
| 2010/0174599 A1 | 7/2010 | Rosenblatt |
| 2010/0192147 A1 | 7/2010 | Kadota |
| 2010/0192211 A1 | 7/2010 | Bono et al. |
| 2010/0201489 A1 | 8/2010 | Griffin |
| 2010/0211793 A1 | 8/2010 | Park et al. |
| 2010/0221999 A1 | 9/2010 | Braun et al. |
| 2010/0229165 A1 | 9/2010 | Normington et al. |
| 2010/0257569 A1 * | 10/2010 | O'Hanlon ................. G11B 27/10 |
| | | 725/110 |
| 2010/0278345 A1 | 11/2010 | Alsina et al. |
| 2010/0287513 A1 | 11/2010 | Singh et al. |
| 2010/0287547 A1 | 11/2010 | Korkishko et al. |
| 2010/0293383 A1 | 11/2010 | Coughlin et al. |
| 2010/0318997 A1 | 12/2010 | Li et al. |
| 2011/0066851 A1 | 3/2011 | Bello et al. |
| 2011/0070827 A1 | 3/2011 | Griffin et al. |
| 2011/0070837 A1 | 3/2011 | Griffin et al. |
| 2011/0098030 A1 | 4/2011 | Luoma |
| 2011/0125799 A1 | 5/2011 | Kandasamy et al. |
| 2011/0202905 A1 | 8/2011 | Mahajan |
| 2011/0210983 A1 * | 9/2011 | Theimer ............... H04N 1/00198 |
| | | 345/634 |
| 2011/0231836 A1 | 9/2011 | Wookey |
| 2011/0252417 A1 | 10/2011 | Cui et al. |
| 2012/0005674 A1 | 1/2012 | Larimore et al. |
| 2012/0194534 A1 | 8/2012 | Benno et al. |
| 2012/0240236 A1 | 9/2012 | Wyatt et al. |
| 2012/0280837 A1 * | 11/2012 | Clements ................ B61L 3/125 |
| | | 340/988 |
| 2012/0297288 A1 | 11/2012 | Mansouri |
| 2012/0303818 A1 | 11/2012 | Thibeault et al. |
| 2013/0019233 A1 | 1/2013 | Pardehpoosh et al. |

(56) References Cited

U.S. PATENT DOCUMENTS

| | | | |
|---|---|---|---|
| 2013/0054734 A1 | 2/2013 | Bond et al. | |
| 2013/0061273 A1* | 3/2013 | Reisman | G06F 17/30873 725/86 |
| 2013/0062401 A1 | 3/2013 | Sheehan et al. | |
| 2013/0065526 A1 | 3/2013 | Pottier et al. | |
| 2013/0067459 A1 | 3/2013 | Sannidhanam | |
| 2013/0078948 A1 | 3/2013 | Pecen et al. | |
| 2013/0078949 A1 | 3/2013 | Pecen et al. | |
| 2013/0263262 A1 | 10/2013 | Forristal | |
| 2013/0283377 A1 | 10/2013 | Das et al. | |
| 2014/0173071 A1 | 6/2014 | Hazen | |
| 2015/0135206 A1* | 5/2015 | Reisman | H04N 21/26283 725/18 |
| 2015/0135214 A1* | 5/2015 | Reisman | H04N 21/64322 725/37 |
| 2015/0178495 A1 | 6/2015 | Sheehan et al. | |

FOREIGN PATENT DOCUMENTS

| | | |
|---|---|---|
| CN | 1633084 | 6/2005 |
| CN | 1959631 | 5/2007 |
| CN | 101017447 | 8/2007 |
| CN | 101131725 | 2/2008 |
| CN | 101616719 | 12/2009 |
| CN | 101622624 | 1/2010 |
| CN | 101925913 | 12/2010 |
| CN | 102129364 | 7/2011 |
| CN | 102938939 | 2/2013 |
| EP | 2086206 | 8/2009 |
| JP | 2002517854 | 6/2002 |
| JP | 2004192601 | 7/2004 |
| JP | 2005129066 | 5/2005 |
| JP | 2005528051 | 9/2005 |
| JP | 2010176690 | 8/2010 |
| JP | 2011002962 | 1/2011 |
| JP | 2013041370 | 2/2013 |
| WO | WO-0205184 | 1/2002 |
| WO | WO-03100581 | 12/2003 |
| WO | WO-2009047473 | 4/2009 |
| WO | WO-2010002497 | 1/2010 |
| WO | WO-2013036472 | 3/2013 |
| WO | WO-2013039528 | 3/2013 |

OTHER PUBLICATIONS

"Foreign Office Action", CN Application No. 201210335798.6, dated Sep. 23, 2014, 13 pages.
"Non-Final Office Action", U.S. Appl. No. 13/229,446, dated Oct. 23, 2014, 17 pages.
"Non-Final Office Action", U.S. Appl. No. 13/230,640, dated Oct. 21, 2014, 15 pages.
"Notice of Allowance", U.S. Appl. No. 13/228,695, dated Nov. 10, 2014, 8 pages.
"Loading HTML Content from a Stream", Retrieved at <<http://msdn.microsoft.com/en-us/library/aa752047(v=vs.85).aspx>>, Retrieved Date: Mar. 7, 2013, pp. 3.
"Class StreamSource", Retrieved at <<http://docs.oracle.com/javase/6/docs/api/javax/xml/transform/stream/StreamSource.html>>, Retrieved Date: Mar. 7, 2013, pp. 6.
Steinberg, et al., "A Web Middleware Architecture for Dynamic Customization of Web Content for Non-Traditional Clients", Retrieved at <<http://www2002.org/CDROM/refereed/483/>>, In Proceedings of the 11th International Conference on World Wide Web, May 7, 2002, pp. 20.
"Customizing the Content, Look and Feel of XML Data", Retrieved at <<https://docs.tibco.com/pub/hawk/4.9.0_november_2010/html/tib_hawk_http_adapter_user_guide/wwhelp/wwhimpl/common/html/wwhelp.htm#context=tib_hawk_http_adapter_user_guide&file=httpAdap.3.05.htm>>, Retrieved Date: Mar. 7, 2013, pp. 3.
"Extended European Search Report", EP Application No. 11872418.6, dated Apr. 29, 2015, 7 pages.
"Final Office Action", U.S. Appl. No. 13/229,446, dated Jun. 19, 2015, 18 pages.
"Final Office Action", U.S. Appl. No. 13/230,640, dated Mar. 25, 2015, 18 pages.
"Foreign Office Action", CN Application No. 201210335798.6, dated May 5, 2015, 15 pages.
"Final Office Action", U.S. Appl. No. 13/229,446, dated Apr. 9, 2014, 19 pages.
"Non-Final Office Action", U.S. Appl. No. 13/228,695, dated Apr. 30, 2014, 9 pages.
"Non-Final Office Action", U.S. Appl. No. 13/229,446, dated Oct. 22, 2013, 16 pages.
Abadi, et al., "A Logical Account of NGSCB", Retrieved from <http://research.microsoft.com/apps/pubs/default.aspx?id=54445> Apr. 19, 2014, Sep. 2004, 13 pages.
"Access Control Lists in Linux", Retrieved at <<http://users.suse.com/~agruen/acl/chapter/fs_acl-en.pdf>>, (Jul. 18, 2003),13 pages.
"Amid Privacy Concerns, Apple Has Started Rejecting Apps That Access UDIDs", Retrieved from <http://techcrunch.com/2012/03/24/apple-udids/> on Jul. 9, 2012, (Mar. 24, 2012),1 page.
"Android Developers Security and Permissions", Retrieved from: <http://developer.android.com/guide/topics/security/security.html> on Jul. 18, 2011, (Jul. 18, 2011), 5 pages.
"Authorization API", Retrieved from <http://developers.cloudmade.com/projects/show/auth> on Jul. 9, 2012, 3 pages.
"CFUUID Reference", Retrieved from <https://developer.apple.com/library/mac/documentation/CoreFoundation/Reference/CFUUIDRef/CFUUIDRef.pdf>, (Jun. 11, 2012),16 pages.
"ClickOnce Security and Deployment", Retrieved at <<http://msdn.microsoft.com/en-us/library/t71a733d%28d=printer%29.aspx>> on Mar. 15, 2013, 4 pages.
"Dependency Resolution Rules", retrieved from http://nuget.codeplex.com/wikipage?title=Dependency%20Resolution on Jul. 15, 2011, 3 pages.
"Final Office Action", U.S. Appl. No. 13/228,695, (dated May 31, 2013),14 pages.
"Identifying App Installations", Retrieved from <http://android-developers.blogspot.in/2011/03/identifying-app-installations.html>, (Mar. 30, 2011), 4 pages.
"LoKast shares media between iPhones and Android phones", retrieved from <<http://venturebeat.com/2010/07/21/lokast-shares-media-between-iphones-and-android-phones/>>, (Jul. 21, 2010), 3 pages.
"Network Policy Settings Properties", Retrieved from: <http://technet.microsoft.com/en-us/library/cc772474%28WS.10%29.aspx> on Jul. 25, 2011,1 page.
"Non-Final Office Action", U.S. Appl. No. 13/228,695, (dated Feb. 12, 2013), 9 pages.
"SecureUDID", Retrieved from <http://www.secureudid.org/> on Dec. 11, 2012, 3 pages.
"Securing the Process Control Network", *Enterasys Secure Networks*, Available at <http://www.enterasys.com/company/literature/threat-mgmt-process-control-wp.pdf>,(Apr. 2009), 6 pages.
"Security for Runtime Resources: Access Control Lists", retrieved from <http://publib.boulder.ibm.com/infocenter/wmbhelp/v6r1m0/index.jsp?topic=/com.ibm.etools.mft.doc/ap01380_.htm> on Jul. 27, 2011, 3 pages.
"Structural Analysis", retrieved from http://www.headwaysoftware.com/products/structure101/structrual-analysis.php#deep-structural-analysis-section on Jul. 15, 2011, 10 pages.
"User Accounts & Admin Privelages", Retrieved at <http://www.techno-kitten.com/Changes_to_PowerBuilder/9_New_in_Power._._B111_New_-_User_Accounts_and_Aipb111_new_-_user_accounts_and_a.html>, Retrieved Date: Jul. 29, 2011,, 2 pages.
Abadi, Martin et al., "Access Control in a World of Software Diversity", *HTOS '05*, available at <http://research.microsoft.com/pubs/54665/accesscontrolwithdiversity.pdf>,(Jun. 2005), 6 pages.
Beede, et al., "MyShield: Protecting Mobile Device Data via Security Circles", *Technical Report CU-CS-1091-12*, Retrieved from <https://www.cs.colorado.edu/department/publications/reports/docs/CU-CS-1091-12.pdf> on Jul. 9, 2012,(Jan. 29, 2012),14 pages.

(56) References Cited

OTHER PUBLICATIONS

Begemann, Ole "UDID Replacement APIs in iOS 6", Retrieved from <http://oleb.net/blog/2012/09/udid-apis-in-ios-6/> on Dec. 11, 2012, (Sep. 20, 2012), 4 pages.

Burrows, Daniel "Modelling and Resolving Software Dependencies", retrieved from http://people.debian.org/~dburrows/model.pdf, (Jun. 15, 2005), pp. 1-16.

Egele, et al., "PiOS: Detecting Privacy Leaks in iOS Applications", *In 18th Annual Network and Distributed System Security Symposium*, Retrieved from <https://www.seclab.tuwien.ac.at/papers/egele-ndss11.pdf>,(Feb. 2011),15 pages.

Engelsma, Jonathan R., et al., "EncounterEngine: Integrating Bluetooth User Proximity Data into Social Applications", *IEEE International Conference on Wireless & Mobile Computing, Networking & Communication*, (2008), pp. 502-507.

Eno, et al., "How to find serial number of Android device?", Retrieved from <http://stackoverflow.com/questions/2322234/how-to-find-serial-number-of-android-device>, (Feb. 23, 2012), 6 pages.

Esbensen, Morten et al., "Pour Images—An Interactive System for Sharing Images", (2010), 9 pages.

Galindo, Jose A., et al., "Debian Packages Repositories as Software Product Line Models. Towards Automated Analysis", retrieved from http://www.isi.us.es/~segura/files/papers/qalindo10-acota.pdf; *Proceedings of the First International Workshop on Automated Configuration and Tailoring of Applications*, (2010), 6 pages.

Kitz, Georg "Gekitz" "UIDevice with UniqueIdentifier for iOS 5", Retrieved from <https://github.com/gekitz/UIDevice-with-UniqueIdentifier-for-iOS-5> on Dec. 11, 2012, 5 pages.

Kortuem, Gerd et al., "Sensing and Visualizing Spatial Relations of Mobile Devicse", *UIST '05 Proceedings of the 18th Annual ACM Symposium on User Interface Software and Technology,*, (Oct. 2005),10 pages.

Lange, Thomas "FAI Guide (Fully Automatic Installation)", retrieved from http://debian.uni-duisburg-essen.de/misc/FAI/fai-guide_2.5.3.pdf, (Dec. 5, 2005), 70 pages.

Manzoor, Umar et al., "Silent Unattended Installation Package Manager—SUIPM", retrieved from http://ieeexplore.ieee.org/stamp/stamp.jsp?tp=&arnumber=5172599; *International Conference on Computational Intelligence for Modelling Control & Automation*, (Dec. 10-12, 2008), pp. 55-60.

Rekimoto, Jun et al., "Proximal Interactions: A Direct Manipulation Technique for Wireless Networking", (Aug. 2003), 8 pages.

Rodriguez, Jamie "Windows Phone Capabilities Security Model", Retrieved from: <http://blogs.msdn.com/b/jaimer/archive/2010/04/30/windows-phone-capabilities-security-model.aspx> on Jul. 18, 2011,(Apr. 30, 2010), 3 pages.

Smith, Eric "iPhone Applications & Privacy Issues: An Analysis of Application Transmission of iPhone", Retrieved from <http://www.kompatscher.biz/phocadownload/iPhone-Applications-Privacy-Issues.pdf>, (Oct. 1, 2010),19 pages.

Xing, Bo et al., "Proximeter: Enabling Mobile Proximity-Based Content Sharing on Portable Devices", *IEEE International Conference on Pervasive Computing and Communications, PerCom 2009*, (Mar. 2009), 3 pages.

"Non-Final Office Action", U.S. Appl. No. 13/714,389, dated Jan. 5, 2015, 9 pages.

"International Search Report and Written Opinion", Application No. PCT/US2012/053623, dated Dec. 10, 2012, 9 pages.

"Final Office Action", U.S. Appl. No. 13/230,640, dated Apr. 14, 2016, 18 pages.

"Final Office Action", U.S. Appl. No. 13/714,389, dated Feb. 5, 2016, 10 pages.

"Foreign Notice of Allowance", CN Application No. 201210331181.7, Dec. 2, 2015, 4 pages.

"International Search Report and Written Opinion", Application No. PCT/US2011/055538, dated Sep. 3, 2012, 8 pages.

"Notice of Allowance", U.S. Appl. No. 14/639,615, dated Apr. 5, 2016, 8 pages.

"Final Office Action", U.S. Appl. No. 13/226,223, dated Aug. 23, 2013, 18 pages.

"Final Office Action", U.S. Appl. No. 13/226,223, dated Sep. 19, 2014, 22 pages.

"Final Office Action", U.S. Appl. No. 13/229,367, dated Jun. 2, 2015, 19 pages.

"Final Office Action", U.S. Appl. No. 13/229,367, dated Jul. 26, 2013, 17 pages.

"Final Office Action", U.S. Appl. No. 13/229,367, dated Aug. 29, 2014, 17 pages.

"Foreign Office Action", CN Application No. 201210326881.7, dated May 19, 2015, 13 pages.

"Foreign Office Action", CN Application No. 201210331181.7, dated Sep. 1, 2015, 11 pages.

"Foreign Office Action", JP Application No. 2014-529674, dated Sep. 29, 2015, 8 pages.

"Foreign Office Action", JP Application No. 2014-529686, dated Aug. 25, 2015, 8 pages.

"International Search Report and Written Opinion", Application No. PCT/US2011/055741, dated Sep. 12, 2012, 9 pages.

"Non-Final Office Action", U.S. Appl. No. 13/226,223, dated Apr. 17, 2013, 15 pages.

"Non-Final Office Action", U.S. Appl. No. 13/226,223, dated May 30, 2014, 24 pages.

"Non-Final Office Action", U.S. Appl. No. 13/226,223, Nov. 14, 2014, 29 pages.

"Non-Final Office Action", U.S. Appl. No. 13/229,367, dated Jan. 30, 2015, 18 pages.

"Non-Final Office Action", U.S. Appl. No. 13/229,367, dated Mar. 21, 2013, 16 pages.

"Non-Final Office Action", U.S. Appl. No. 13/229,367, dated Mar. 31, 2014, 16 pages.

"Non-Final Office Action", U.S. Appl. No. 13/229,367, dated Oct. 8, 2015, 31 pages.

"Non-Final Office Action", U.S. Appl. No. 13/229,446, dated Nov. 13, 2015, 19 pages.

"Non-Final Office Action", U.S. Appl. No. 14/639,615, dated Oct. 21, 2015, 5 pages.

"Notice of Allowance", U.S. Appl. No. 13/226,223, dated Apr. 8, 2015, 12 pages.

"Extended European Search Report", EP Application No. 11872101.8, dated Apr. 9, 2015, 6 pages.

"Extended European Search Report", EP Application No. 12830755.0, dated Mar. 24, 2015, 6 pages.

"Foreign Office Action", CN Application No. 201210326881.7, dated Sep. 3, 2014, 13 pages.

"Foreign Office Action", CN Application No. 201210331181.7, dated Oct. 8, 2014, 14 pages.

"Manifest Permission", Android Developers, Apr. 28, 2011, 18 pages.

"Non-Final Office Action", U.S. Appl. No. 13/230,640, dated Jul. 23, 2015, 19 Pages.

"Non-Final Office Action", U.S. Appl. No. 13/714,389, dated Jul. 13, 2015, 9 pages.

Smith,"iPhone Applications and Privacy Issues: An Analysis of Application Transmission of iPhone Unique Device Identifiers (UDIDs)", iPhone Applications and Privacy Issues, Oct. 1, 2010, 19 pages.

"Foreign Office Action", JP Application No. 2014-529794, dated Aug. 9, 2016, 6 pages.

"Final Office Action", U.S. Appl. No. 13/229,367, dated Mar. 11, 2016, 33 pages.

"Final Office Action", U.S. Appl. No. 13/229,446, dated Jun. 2, 2016, 21 pages.

"Foreign Notice of Allowance", CN Application No. 201210326881.7, dated Mar. 3, 2016, 4 pages.

"Foreign Office Action", CN Application No. 201210326881.7, dated Dec. 24, 2015, 8 pages.

"Foreign Office Action", CN Application No. 201210335798.6, dated Jun. 12, 2016, 7 pages.

"Foreign Office Action", CN Application No. 201210335798.6, dated Dec. 28, 2015, 6 pages.

"Foreign Office Action", JP Application No. 2014-529674, dated Jun. 7, 2016, 8 pages.

(56) References Cited

OTHER PUBLICATIONS

"Foreign Office Action", JP Application No. 2014-529686, dated Apr. 26, 2016, 9 pages.
"Non-Final Office Action", U.S. Appl. No. 13/230,640, dated Aug. 29, 2016, 21 pages.
"Notice of Allowance", U.S. Appl. No. 14/639,615, dated Jul. 13, 2016, 8 pages.
"Notice of Allowance", U.S. Appl. No. 14/639,615, dated Sep. 28, 2016, 8 pages.
"Advisory Action", U.S. Appl. No. 13/230,640, dated May 12, 2017, 3 pages.
"Non-Final Office Action", U.S. Appl. No. 14/639,615, dated Dec. 9, 2016, 10 pages.
"Notice of Allowance", U.S. Appl. No. 13/230,640, dated Jun. 12, 2017, 7 pages.
"Final Office Action", U.S. Appl. No. 13/230,640, dated Mar. 20, 2017, 20 pages.
"Notice of Allowance", U.S. Appl. No. 14/639,615, dated Mar. 23, 2017, 8 pages.
"Non-Final Office Action", U.S. Appl. No. 13/714,389, dated Jan. 13, 2017, 9 pages.
"Final Office Action", U.S. Appl. No. 13/714,389, dated Oct. 25, 2017, 11 pages.

* cited by examiner

RUNTIME RESOLUTION OF CONTENT REFERENCES

BACKGROUND

Publishers oftentimes desire to deliver and store content, such as electronic books and electronic magazines, as a collection of files. A user runs an application on his or her device that invokes a display control on the device to retrieve and display the content. Such display controls, however, are oftentimes provided by an operating system of the device. This can be problematic because content can be stored in the collection of files in different manners, such as being encrypted or compressed. The display controls typically do not have knowledge of the manner in which content is stored in the collection of files, preventing such display controls from displaying the content correctly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an electronic document that includes one or more references to content is obtained. A determination is made that the content referenced by one of the one or more references is to be retrieved. In response to determining that the content referenced by the one reference is to be retrieved, the content referenced by the one reference is requested from a resolver. In response to the request, the referenced content is received after the referenced content has been decoded by the resolver.

BRIEF DESCRIPTION OF THE DRAWINGS

The same numbers are used throughout the drawings to reference like features.

DETAILED DESCRIPTION

Runtime resolution of content references is discussed herein. A computing device includes a view control that manages presentation of electronic content on the computing device. The presentation can include displaying content, audibly playing back content, and so forth. The view control is made available to multiple different applications on the computing device. To use the view control, an application provides to the view control an identifier of an electronic document to be displayed as well as an indication of a resolver for the view control to use. The view control requests the identified electronic document from the resolver, and in response the resolver accesses and decodes the electronic document. This decoding can take various forms, such as decrypting the electronic document, decompressing the electronic document, and so forth. The resolver returns the decoded electronic document to the view control, which displays or otherwise presents the content of the electronic document. Because the resolver decodes the electronic document, the view control need not have knowledge of the specific manner in which the electronic document is encoded by the electronic document publisher.

The electronic document as returned to the view control can optionally reference one or more additional files including data to be displayed or otherwise presented as part of the electronic document. The view control provides identifiers of those one or more additional files to the resolver, which accesses and decodes the content in the one or more additional files, and returns the decoded content to the view control for display or other presentation.

Figure 1:
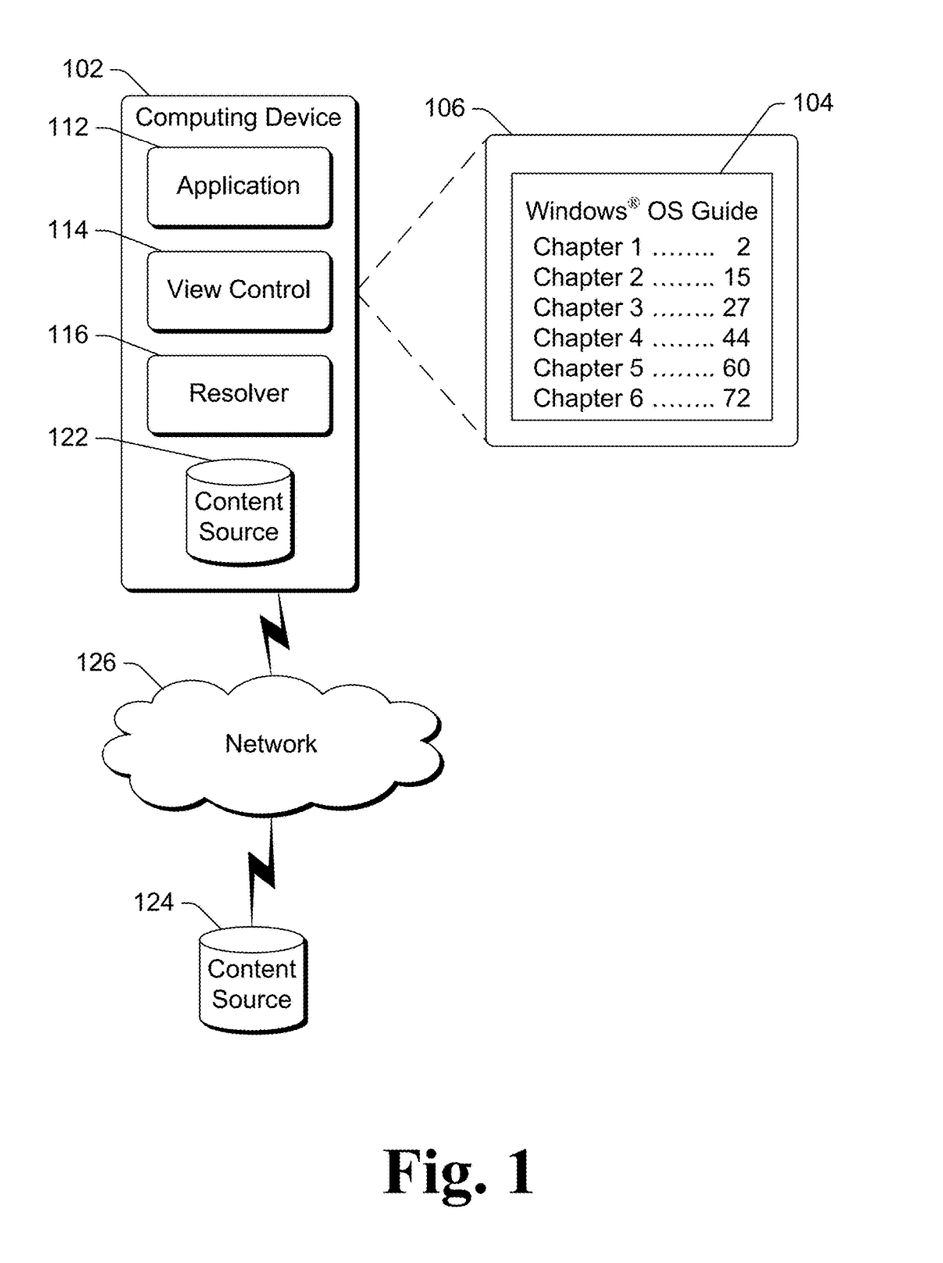
FIG. 1 illustrates an example system implementing the runtime resolution of content references in accordance with one or more embodiments.

FIG. 1 illustrates an example system 100 implementing the runtime resolution of content references in accordance with one or more embodiments. System 100 includes a computing device 102, which can be a variety of different types of devices, such as a physical device or a virtual device. For example, the computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. The computing device 102 can also be a virtual device, such as a virtual machine running on a physical device. A virtual machine can be run on any of a variety of different types of physical devices (e.g., any of the various types listed above). Thus, the computing device 102 may range from a full resource device with substantial memory and processor resources (e.g., personal computers, game consoles) to a low-resource device with limited memory and/or processing resources (e.g., traditional set-top boxes, handheld game consoles).

The computing device 102 displays or otherwise presents an electronic document in a portion 104 of a display device 106. The portion 104 can be a window displayed on the display device 106, another segment or area of the display device 106, the entire display area of the display device 106, and so forth. The display device 106 can be included as part of the computing device 102. Alternatively, the display device 106 can be separate from the computing device 102, and the computing device 102 can provide one or more signals to the display device 106 indicating the content and other user interface elements to be displayed by the display device 106.

The electronic document can include one or more of various types of electronic content that can be displayed or otherwise presented by the computing device 102. The electronic content can include, for example, text, images, video, audio, buttons or other user-selectable links, scripts, code or documents written in various languages (e.g., JavaScript, Cascading Style Sheets (CSS), HyperText Markup Language (HTML), etc.), and so forth. In the illustrated example, the electronic document displayed in the portion 104 is an index page of an electronic publication that is an electronic book. However, other types of electronic documents can be displayed or otherwise presented by the computing device, such as other electronic publications (e.g., electronic magazines), interactive books or other publications, and so forth.

The computing device 102 includes an application 112, a view control 114, and a resolver 116. The application 112 provides to the view control 114 an indication of an electronic document to be displayed by the view control 114. The view control 114 provides to the resolver 116 identifiers of content to be retrieved by the resolver 116, which can include the electronic document itself as well as content referenced in the electronic document. The resolver 116 retrieves the identified content from one or more content sources 122 and 124, decodes the retrieved content as appropriate, and provides the retrieved content to the view control 114. The view control 114 displays the electronic content of the document in the portion 104 of the display device 106. The view control 114 can additionally or alternatively present the electronic content of the document in manners other than displaying the content, such as playing back audio content. Although illustrated as separate from the application, the view control 114 can alternatively be included as part of the application 112.

Additionally, the electronic document can optionally be or include a program, and the content referenced in the electronic document can be portions of the program. The view control can present the electronic content by running or executing the electronic content.

The resolver 116 can retrieve content from the content source 122 that is local to the computing device 102, such as a fixed or removable storage device of the computing device 102. The resolver 116 can additionally or alternatively retrieve content from the content source 124 that is remote from the computing device 102 and accessed by the computing device 102 via a network 126. The network 126 can be any one or more of a variety of different networks, such as the Internet, a local area network (LAN), a public telephone network, an intranet, other public and/or proprietary networks, combinations thereof, and so forth.

The resolver 116 retrieves the identified content and decodes the retrieved content as appropriate, such as by decrypting or decompressing the content as discussed in more detail below. The view control 114 need not have knowledge of the manner in which the content is encoded or the manner in which to decode the content. Rather, the view control 114 relies on the resolver 116 to decode the content. The view control 114 also need not have knowledge of how to retrieve the content from the content source 122 or 124. Rather, the view control 114 relies on the resolver 116 to retrieve the content. Thus, the view control can provide generic display or presentation functionality to multiple different applications, needing no knowledge of how to decode content for the different applications.

Figure 2:
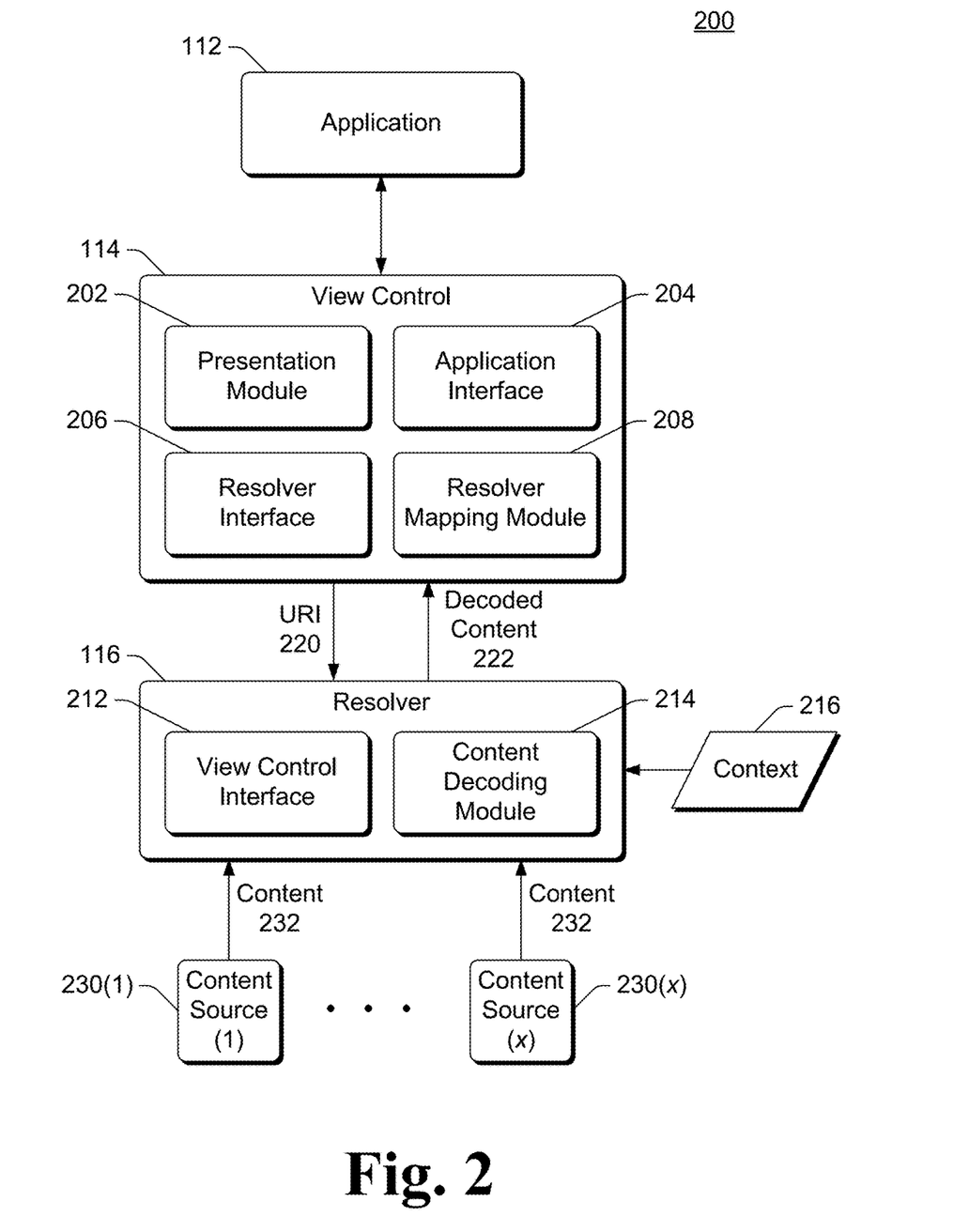
FIG. 2 illustrates another example system implementing the runtime resolution of content references is in accordance with one or more embodiments.

FIG. 2 illustrates an example system 200 implementing the runtime resolution of content references in accordance with one or more embodiments. System 200 includes the application 112, the view control 114, and the resolver 116 as discussed above. The view control 114 includes a presentation module 202, an application interface 204, a resolver interface 206, and a resolver mapping module 208. The resolver 116 includes a view control interface 212 and a content decoding module 214.

Generally, during operation of the system 200, the application 112 provides to the view control 114 an indication of an electronic document to be displayed or otherwise presented, as well as an indication of the resolver 116. The view control 114 encounters references to (e.g., identifiers of) content when presenting the electronic document for the application 112. These references to content can be included in an electronic document, or can be an identifier of the electronic document itself. The references to content are resolved by the view control 114 providing the reference to the resolver 116, which retrieves the identified content, decodes the retrieved content, and returns the decoded content to the view control 114 for presentation by the view control 114. The resolution of these references to content occurs during runtime, which refers to the time when the view control 114 is displaying or otherwise presenting an electronic document on a computing device.

The application interface 204 is a mechanism via which the application 112 can request that an electronic document be displayed by the view control 114. To have the view control 114 present an electronic document, the application 112 provides an indication of the electronic document to be displayed or otherwise presented as well as an indication of the resolver 116 to be used to decode the electronic document. The indication can be provided in different manners, such as by invoking a method of an application programming interface (API) or a delegate exposed by the application interface 204. Alternatively, rather than the application 112 providing an indication of the resolver 116, the resolver 116 can be identified in other manners, such as the view control 114 being configured with an indication of the resolver 116, the view control 114 receiving an indication of the resolver 116 from another component or module, and so forth.

In one or more embodiments, the view control 114 communicates with one resolver per electronic document. Alternatively, although a single resolver 116 is illustrated in FIG. 2, the view control 114 can communicate with multiple resolvers and an application 112 can use multiple resolvers to decode an electronic document. Thus, the application 112 can provide an indication of multiple resolvers to the view control 114, or multiple resolvers can be identified in other manners.

In one or more embodiments, the application 112 also provides context 216 to the view control 114 via the application interface 204. This context is provided by the view control 114 to the resolver 116 for the resolver 116 to use in decoding electronic content. The context 216 can be provided to the view control in different manners, such as a parameter of a method of the API exposed by the application interface 204, embedded in the identifier of the electronic content, and so forth. The context 216 can alternatively be made available to the resolver 116 in other manners, such as received by the resolver 116 from another component or module, obtained by the resolver 116 from a particular storage location, and so forth.

The context 216 can be any of a variety of different information that can be used in decoding electronic content. For example, the context 216 can provide an indication of the type of decryption to be used (e.g., the decryption algorithm or technique to be used), a type of decompression to be used (e.g., the decompression algorithm or technique to be used), a type of transcoding to perform (e.g., formats that audio, video, image, text, or other content are to be converted from and/or into), and so forth. The context 216 can also provide an indication of personalization to be applied in decoding the electronic content, such as personalizing the electronic content for a particular user or a particular computing device. Such personalization context can include, for example, a language that the electronic content is to be translated into as part of the decoding, an indication of one of multiple different versions (e.g., previously translated into different languages) of the electronic content that is to be selected as part of the decoding, an indication of one of multiple different versions having different resolutions (e.g., video, image, or audio resolutions) that is to be selected as part of the decoding, and so forth. The context 216 can also provide an indication of storage locations, such as directories, folders, or other locations of a content source where files including electronic content are stored.

In one or more embodiments, the indication of the electronic document provided by the application 112 is a uniform resource indicator (URI) including both a name of a file in which the electronic document is stored and a path identifying the location of that file. The indication of the resolver 116 is embedded in the URI, and the resolver mapping module 208 identifies the appropriate resolver 116 to decode the electronic content based on the indication of the resolver 116 in the URI. The resolver mapping module 208 can identify the proper resolver 116 in a variety of different manners, such as by maintaining a mapping of a portion of the URI (e.g., a hostname portion) to resolvers, applying an algorithm or set of rules to a portion of the URI (e.g., a hostname portion) to extract an identifier of the resolver 116 from the portion of the URI, and so forth.

Alternatively, rather than embedding an indication of the resolver 116 in the URI, the application 112 can provide an indication of the resolver 116 to the view control 114 in other manners. For example, a separate API method exposed by the application interface 204 can be invoked by the application 112 to provide the indication of the resolver 116.

The resolver interface 206 manages communication with the resolver 116. This communication includes providing an indication of the desired electronic document or other desired electronic content to the resolver 116, illustrated as URI 220 in FIG. 2. This communication also includes receiving the decoded electronic document or other electronic content from the resolver 116, illustrated as decoded content 222 in FIG. 2.

The presentation module 202 manages presentation (e.g., displaying, audio playback, and so forth) of the decoded electronic content. The presentation module 202 operates based on a particular data format, such as any of a variety of markup language formats (e.g., the HTML format) or other standard or known formats. The view control 114 need not have, and typically does not have, knowledge of the manner in which the electronic content is encoded (e.g., encrypted, compressed, and so forth). Rather, the view control 114 relies on the resolver 116 to decode the electronic content as appropriate and return to the presentation module 202 the decoded electronic content in the particular data format.

The electronic document being displayed or requested to be displayed can also be referred to as electronic content. In one or more embodiments, the electronic document includes all of the electronic content displayed as the electronic document. Alternatively, at least some (and possibly all) of the electronic content displayed as the electronic document can be identified by a reference to the electronic content, the reference being included in the electronic document. For example, the electronic document may include some electronic content that can be displayed (e.g., text), and include references to other electronic content that can be displayed (e.g., images or video). These references are also referred to as relative references because they reference data that is displayed or otherwise presented as part of (and thus relative to) the electronic document.

The electronic content identified by relative references is obtained by the view control in an analogous manner to obtaining the electronic document. An indication of the desired electronic content (e.g., the relative reference itself) is provided to the resolver 116, illustrated as URI 220 in FIG. 2. The decoded electronic content is received from the resolver 116, illustrated as decoded content 222 in FIG. 2.

The resolver 116 includes the view control interface 212 and the content decoding module 214. The view control interface 212 provides a mechanism via which the view control 114 can request electronic content. To obtain electronic content, the resolver interface 206 provides an indication of the desired electronic content to the view control interface 212. The indication can be provided in different manners, such as by invoking a method of an API or delegate exposed by the view control interface 212.

The view control interface 212 obtains the requested content from one or more content sources 230(1), . . . , 230(x). Each content source 230 can be a content source 122 or 124 of FIG. 1, and can be a local source or a remote source. In one or more embodiments, the request for the electronic content received from the view control 114 includes an indication of the content source 230 from which the requested electronic content is to be obtained. Alternatively, the resolver 116 can otherwise have knowledge of the content source 230 from which the requested electronic content is to be obtained by the view control interface 212, such as the resolver 116 being pre-configured with an indication of the content source 230, the resolver 116 obtaining an indication of the content source 230 from another device or module, the context 216 indicating the content source 230, and so forth.

The view control interface 212 retrieves the content from the appropriate content source 230, illustrated as content 232. The view control interface 212 can retrieve the content in different manners, such as by sending a request for the content to the content source 230, accessing the content source (e.g., a file directory or folder) directly, and so forth.

The content received from the content source 230 can be encoded in various manners, and the content decoding module 214 is configured with and/or obtains the knowledge of how to decode the content. For example, the content decoding module 214 can be pre-configured with the knowledge, the content decoding module 214 can obtain the knowledge from the context 216, and so forth.

In one or more embodiments, the content received from the content source 230 is encrypted, and the content decoding module 214 decodes the content by decrypting the content. In other embodiments, the content received from the content source 230 is compressed, and the content decoding module 214 decodes the content by decompressing the content. In other embodiments, the content decoding module 214 decodes the content by personalizing the content for a user of the system 200 or a device implementing the system 200. For example, the content decoding module 214 can translate the content into a particular language or select a particular version of the content, and so forth. In other embodiments, the content decoding module 214 decodes the content by transcoding the content (e.g., converting the electronic content from one format to another, such as from a Portable Document Format (PDF) to an HTML format).

The view control interface 212 returns the decoded content to the resolver interface 206, shown as the decoded content 222. In one or more embodiments, the decoded content is streamed to the resolver interface 206 as the decoded content becomes available. For example, as bytes or other groups of the content is decoded, the decoded bytes or other groups are provided to the resolver interface 206. Alternatively, the view control interface 212 can provide the decoded content to the resolver interface 206 after the content decoding module 214 completes decoding the content.

Additionally, in one or more embodiments the decoded content is streamed to the resolver interface 206 asynchronously. The presentation module 202 need not wait for the decoded content in order to continue presentation of the electronic document. For example, the presentation module 202 may display or otherwise present other electronic content of electronic document while waiting for particular decoded content. By way of another example, the resolver interface 206 may provide multiple requests from multiple different electronic content to the resolver 116 and display each electronic content as it is received regardless of the order in which the requests are responded to. Alternatively, the decoded content can be streamed to the resolver interface 206 synchronously, with the presentation module 202 waiting for the decoded content prior to continuing presentation of the electronic document.

It should be noted that although the resolver 116 is discussed as decoding electronic content, situations can arise in which some electronic content is not encoded. In such situations, the presentation module 202 can obtain the non-encoded electronic content from the appropriate content source 230 directly, bypassing the resolver 116. For example, the electronic document may not be encoded, but the electronic content referenced by the relative references included in the electronic document may be encoded. Alternatively, the resolver interface 206 can request the non-encoded electronic content from the resolver 116, and the non-encoded electronic content is returned to the resolver interface 206 without having been decoded by the content decoding module 214.

Electronic content can be identified in a variety of different manners. In one or more embodiments, the same identifier format is used for the identifier of the electronic document as well as the identifiers that are the relative references. Thus, a common electronic content identifier format can be used, regardless of whether an electronic document or other electronic content is being identified.

Figure 3:
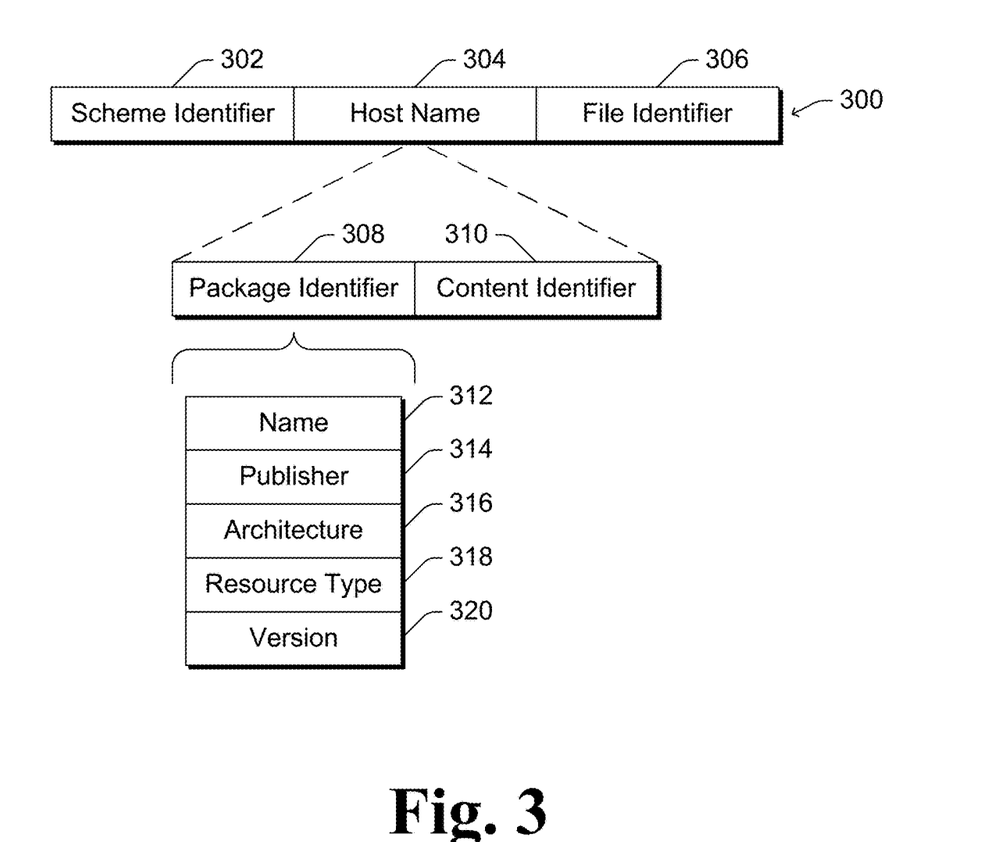
FIG. 3 illustrates an example format for an electronic content identifier in accordance with one or more embodiments.

FIG. 3 illustrates an example format for an electronic content identifier 300 in accordance with one or more embodiments. The electronic content identifier 300 is a URI that includes three portions: a portion including a scheme identifier 302, a portion including a host name 304, and a portion including a file identifier 306. The scheme identifier 302 identifies a URI scheme for the identifier 300, and is a value that indicates that electronic content to be obtained by a resolver (e.g., the resolver 116 of FIG. 2) is being identified by the identifier 300. Any of a variety of different values can be used as the scheme identifier 302, such as the value "local-stream-URI" or "ms-local-streamURI".

The host name 304 includes two portions: a portion including a package identifier 308 and a portion including a content identifier 310. The package identifier identifies the application 112 for which the identifier 300 is received. For an electronic document as well as relative references in an electronic document, the application 112 for which the identifier 300 is received refers to the application that provided the identifier of the electronic document to the view control 114. The content identifier 310 identifies the resolver 116 that is to obtain and decode the electronic content identified by the identifier 300. The resolvers 116 can be assigned identifiers in any of a variety of different manners and in any of a variety of different forms as desired by the designer of the application 112.

The package identifier 308 can identify the application 112 in any of a variety of different manners, such as using a name of the application 112, an identifier of the application 112 assigned by an operating system of the device running the application 112, and so forth. In one or more embodiments, the application 112 is included in a package for deployment or installation on a computing device, and the package includes one or more components or modules for the application 112 (and optionally one or more additional applications). These components or modules can include binary code that is executed as part of the application 112 or code that is interpreted or otherwise processed as part of the application 112, text or images that are part of (resources of) the application 112 or other data that is part of application 112, a library that is part of or used by the application 112, and so forth. The package identifier 308 can be a package identifier of the package including the application 112.

The package identifier 308 can include various elements. In the illustrated example, the elements of package identifier 308 are a name 312, a publisher 314, an architecture 316, a resource type 318, and a version 320. All of the illustrated elements of the package identifier 308 can be used as the package identifier 308, or alternatively a subset of the elements illustrated can be used (e.g., the package identifier 308 may include just the name 312).

The name 312 is a name assigned to the package including the application 112 by the developer of the package. The developer can choose any name they desire, such as a name identifying the application 112. The publisher 314 is a name of the publisher of the package including the application 112 (also referred to as the publisher of the application included in the package for deployment), such as the developer or distributor of the package. The publisher can identify various entities such as a corporation, an individual, etc. The architecture 316 refers to the processor and/or device architecture with which the components or modules of the package including the application 112 are designed to operate. The developer can choose one or more architecture identifiers to include as the architecture 316. Various different processor and/or device architectures can be identified, such as an x86 architecture, an x64 architecture, a RISC (reduced instruction set computer architecture), and so forth. The version 320 is a version identifier of the package including the application 112 (and can also refer to a version of the application 112 included in the package). The developer can choose any versioning indications (e.g., numeric sequences, alphanumeric sequences, etc.) that they desire.

The resource type 318 can be any of a variety of different values or attributes identifying characteristics of the package including the application 112. The developer can choose any characteristics that they desire. These characteristics can include, for example, the country or geographic region in which the components or modules of the package are designed to operate, the language (e.g., English, French, Japanese, etc.) that the components or modules of the package use, a form factor (e.g., desktop/laptop, tablet/slate, etc.) for which the components or modules of the package are designed to operate, one or more screen resolutions for which the components or modules of the package are designed to operate, whether the package includes trial versions or fully licensed versions of applications, and so forth.

Although illustrated as including a name 312, a publisher 314, an architecture 316, a resource type 318, and a version 320, it should be noted that in other embodiments the package identifier 308 can include other combinations of elements. For example, in some embodiments additional elements (not shown) can be included in the package identifier 308. By way of another example, in some embodiments one or more of these elements (e.g., the architecture 316, the resource type 318, and/or the version 320) may not be included in the package identifier 308.

The content identifier 310 identifies the resolver 116 that is to obtain and decode the electronic content identified by the identifier 300. The content identifier 310 can identify the resolver 116 in any of a variety of different manners, such as using a name or other indication of the resolver 116.

The file identifier 306 is an identifier of the file or other container in which the electronic content is stored. In one or more embodiments, the file identifier 306 is a file name of a file in which the electronic content is stored. The file identifier 306 can also include a path name identifying where the file or other container is located at the content source. For example, the file identifier 306 can include the name of a folder or directory in which file that includes the electronic content is stored.

It should be noted that the values in the various portions of the identifier 300 can include various different characters, including different letters, numbers, symbols, and so forth. In one or more embodiments, various values in the portions of the identifier 300 can be encoded using various encoding schemes. For example, the content identifier 310 can be encoded using hex encoding.

It should also be noted that the application 112 can maintain state associated with an electronic document, and this state is maintained as associated with the host name 304. This state can include various information, such as information regarding accesses to the electronic document (e.g., in cookies), information regarding a user of the application as provided or authorized by the user, and so forth. An electronic document is restricted, by an operating system or other module or component of the computing device, to accessing the state associated with the host name for that electronic document. Thus, electronic content in one electronic document is prohibited from accessing state associated with another electronic document having a different host name 304.

In one or more embodiments, the API exposed by the application interface 204 is a NavigateToLocalStreamURI API. The NavigateToLocalStreamURI API includes a NavigateToStream method that has as parameters an electronic document identifier and a resolver. The electronic document identifier is an identifier of the electronic document to be displayed or otherwise presented by the presentation module 202. The identifier of the electronic document can take various forms, such as a URI as discussed above. The resolver is the resolver 116 to be accessed by the view control 114 to obtain electronic content. Alternatively, an identifier of a resolver may be a parameter of the NavigateToStream method rather than the resolver itself being the parameter. In response to the NavigateToStream method being invoked by the application 112, the identified electronic document is displayed or otherwise presented by the presentation module 202 as discussed above.

In one or more embodiments, the API exposed by the view control interface 212 is an iURIToStreamResolver API. The iURIToStreamResolver API includes a URIToStreamAsynch method that has as a parameter an identifier of electronic content. The identifier of the electronic content can take various forms, such as a URI as discussed above. In response to the URIToStreamAsynch method being invoked by the view control 114, the resolver 116 obtains and decodes the identified content, and returns the decoded electronic content to the view control 114.

Figure 4:
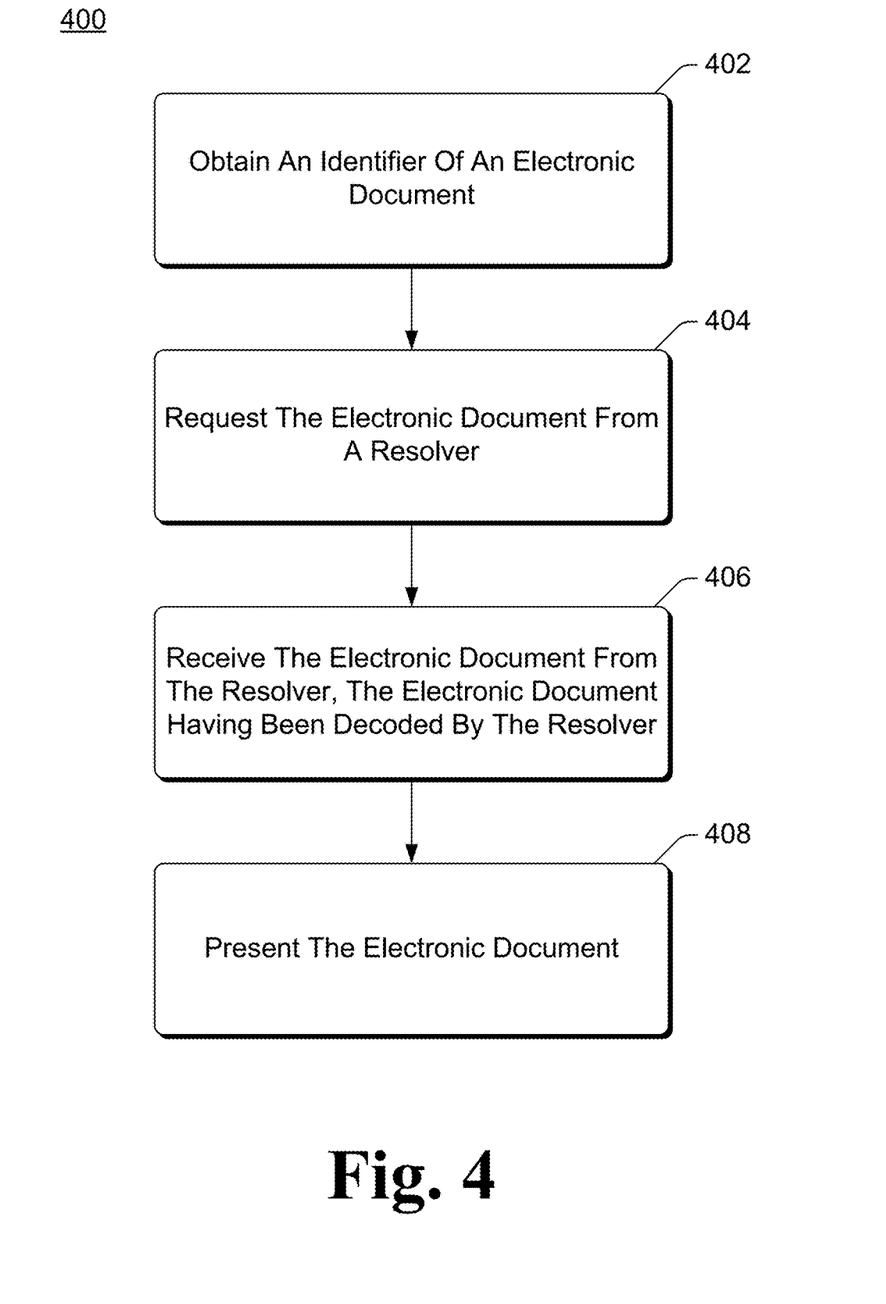
FIG. 4 is a flowchart illustrating an example process for presenting an electronic document in accordance with one or more embodiments.

FIG. 4 is a flowchart illustrating an example process 400 for presenting an electronic document in accordance with one or more embodiments. Process 400 is carried out by a view control, such as view control 114 discussed above, and can be implemented in software, firmware, hardware, or combinations thereof. Process 400 is shown as a set of acts and is not limited to the order shown for performing the operations of the various acts. Process 400 is an example process for presenting an electronic document; additional discussions of presenting an electronic document are included herein with reference to different figures.

In process 400, an identifier of an electronic document is obtained (act 402). The identifier of the electronic document can be obtained from an application, such as application 112 as discussed above. Alternatively, the identifier of the electronic document can be obtained in other manners, such as from another device or module, from a user input, and so forth.

The electronic document is requested from a resolver (act 404). The identifier of the electronic document is provided to the resolver, which obtains the electronic document from a content source.

The electronic document, decoded by the resolver, is received from the resolver (act 406). The electronic document can be decoded in various different manners, such as decrypted or decompressed, as discussed above.

The received electronic document is presented (act 408). This presentation can include displaying at least part of the electronic document, playing back audibly at least part of the electronic document, and so forth.

Figure 5:
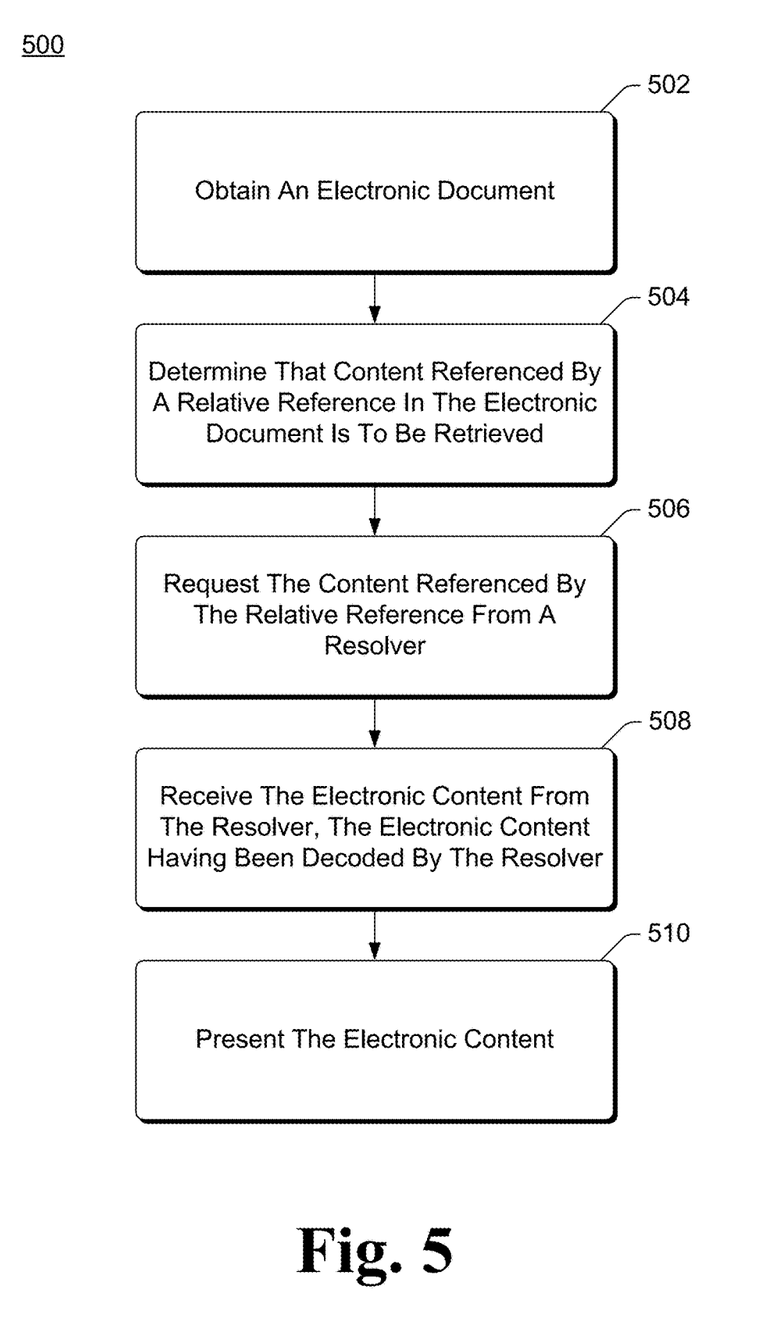
FIG. 5 is a flowchart illustrating an example process for runtime resolution of content references in accordance with one or more embodiments.

FIG. 5 is a flowchart illustrating an example process 500 for runtime resolution of content references in accordance with one or more embodiments. Process 500 is carried out by a view control, such as view control 114 discussed above, and can be implemented in software, firmware, hardware, or combinations thereof. Process 500 is shown as a set of acts and is not limited to the order shown for performing the operations of the various acts. Process 500 is an example process for runtime resolution of content references; additional discussions of runtime resolution of content references are included herein with reference to different figures.

In process 500, an electronic document is obtained (act 502). The electronic document can be obtained from a resolver that decodes the electronic document as discussed above. Alternatively, the electronic document can be obtained in other manners, such as from another device or module, from a content source without being decoded, and so forth.

The electronic document includes one or more relative references to electronic content, and a determination is made that content referenced by one of the relative references is to be retrieved (act 504). The determination is made by the view control as the electronic document is being displayed or otherwise presented. For example, in response to determining that a particular portion of the electronic document in which electronic content referenced by a particular relative reference is to be displayed, the determination is made that the content referenced by the relative reference is to be retrieved. By way of another example, in response to determining that a particular portion of a program in which electronic content (e.g., a JavaScript portion of the program) is to be run, the determination is made that the content referenced by the relative reference is to be retrieved.

The electronic content referenced by the relative reference is requested from a resolver (act 506). The relative reference is provided to the resolver, which obtains the electronic content referenced by the relative reference from a content source.

The electronic content, decoded by the resolver, is received from the resolver (act 508). The electronic content can be decoded in various different manners, such as decrypted or decompressed, as discussed above.

The received electronic content is presented (act 510). This presentation can include displaying at least part of the electronic content, playing back audibly at least part of the electronic content, and so forth. This presentation can also include running or executing the electronic content (e.g., in situations in which the electronic content is a portion of a program).

The techniques discussed herein support various usage scenarios. For example, an electronic publication application can request that the view control display an electronic document that is a magazine, and the individual articles or sections of the magazine can be the electronic content referenced by relative references in the electronic document. The individual articles can be stored in the content source in encrypted form, and the resolver can decrypt the articles and provide the decrypted articles to the view control for display. The articles thus remain protected (encrypted) while being stored, and are only decrypted when being displayed.

By way of another example, an electronic publication application can request that the view control display an electronic document that is a book, and the individual chapters of the book can be the electronic content referenced by relative references in the electronic document. The individual chapters can be stored in the content source in compressed and encrypted form, and the resolver can decrypt and decompress the chapters, and provide the decrypted and decompressed chapters to the view control for display. The chapters thus remain protected (encrypted) while being stored, and are only decrypted when being displayed.

By way of another example, an electronic document can be a program (e.g., executable code, script, interpreted source code, etc.). Various portions of the program can be the electronic content referenced by relative references in the electronic document. These portions of the program can be stored in the content source in encrypted form, and the resolver can decrypt the portions of the program and provide the decrypted portions of the program to the view control to be executed or interpreted. The portions of the program thus remain protected (encrypted) while being stored, and are only decrypted when being run.

Although particular functionality is discussed herein with reference to particular modules, it should be noted that the functionality of individual modules discussed herein can be separated into multiple modules, and/or at least some functionality of multiple modules can be combined into a single module.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
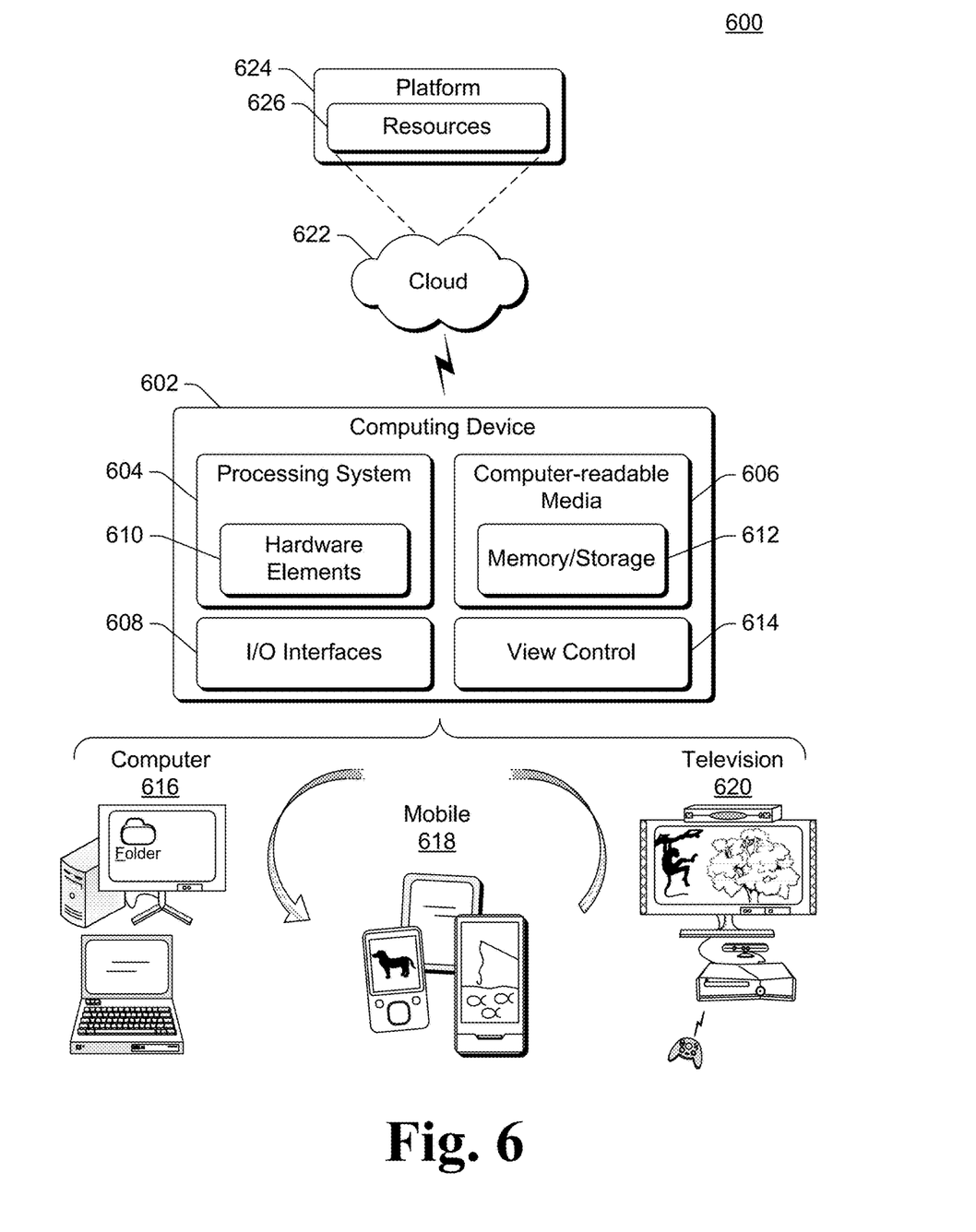
FIG. 6 illustrates an example system generally that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Computing device 602 also includes a view control 614. View control 614 can be, for example, a view control 114 as discussed herein.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device including an application, a view control, and multiple resolvers, the method comprising:
    obtaining, from one of the multiple resolvers by the view control, a decoded electronic document that includes one or more relative references to content to be displayed as part of the decoded electronic document, an indication of an encoded electronic document having been received by the view control from the application;
    determining, by the view control, that the content referenced by one of the one or more relative references is to be retrieved from the multiple resolvers, the view control needing no knowledge of how the referenced content is encoded;
    requesting, by the view control in response to determining that the content referenced by the one relative reference is to be retrieved, the content referenced by the one relative reference from the multiple resolvers;
    acquiring, by the multiple resolvers, context that comprises information used by the multiple resolvers to decode the referenced content;
    determining at least one of the multiple resolvers to decode the referenced content based, at least in part, on the context acquired;
    receiving, by the view control from the at least one of the multiple resolvers in response to the request, the referenced content after the referenced content has been decoded by the at least one of the multiple resolvers; and
    displaying, by the view control, the referenced content.

2. A method as recited in claim 1, the electronic document comprising an electronic book or electronic magazine.

3. A method as recited in claim 1, the receiving comprising receiving the referenced content after the referenced content has been decoded by being decompressed by the at least one of the multiple resolvers.

4. A method as recited in claim 1, the receiving comprising receiving the referenced content after the referenced content has been decoded by being decrypted by the at least one of the multiple resolvers.

5. A method as recited in claim 1, the electronic document comprising a markup language document.

6. A method as recited in claim 1, further comprising:
    exposing, by the view control, an application programming interface to the application;
    receiving, by the view control, an identifier of the electronic document from the application by the application invoking a method of the application programming interface; and
    the requesting the content comprising the view control providing to the one of the multiple resolvers the relative reference to the content by invoking a method of an application programming interface exposed by the resolver.

7. A method as recited in claim 1, further comprising:
    receiving, by the view control, an indication of the multiple resolvers from the application.

8. A method as recited in claim 1, the at least one of the multiple resolvers being one of multiple resolvers in the computing device, the indication of the electronic document comprising a uniform resource indicator, and the method further comprising:
    determining, by the view control and based on the uniform resource locator, at least one of the multiple resolvers to decode the referenced content, an indication of the at least one of the multiple resolvers being embedded in the uniform resource indicator.

9. A method as recited in claim 1, the receiving the referenced content from the at least one of the multiple resolvers comprising receiving the referenced content from the at least one of the multiple resolvers as a stream as the decoded content becomes available from the at least one of the multiple resolvers.

10. A method as recited in claim 1, the determining comprising determining, by the view control, that the content referenced by the one or more relative references is to be retrieved as the electronic document is being displayed.

11. A method as recited in claim 1, the obtaining occurring in response to the view control receiving an identifier of an electronic document specifying the electronic document to be displayed by the view control.

12. A method as recited in claim 11, further comprising the identifier of the electronic document having been obtained from a user input to the application.

13. A method as recited in claim 1, further comprising:
    providing, by the application, a context to the view control via an application interface;
    providing, by the view control to the multiple resolvers, the context; and
    applying, by the multiple resolvers, a personalization to the content referenced by the one of the one or more relative references, the personalization indicated by the context.

14. A computer-readable storage medium having stored thereon multiple instructions that implement an application, a view control, and multiple resolvers and that, responsive to execution by one or more processors of a computing device, cause the one or more processors to perform acts comprising:

receiving, by the view control from the application, an indication of an electronic document that includes one or more references to content;

obtaining, from one of the multiple resolvers by the view control, the electronic document;

determining, by the view control, that the content referenced by one of the one or more references is to be retrieved from the multiple resolvers, the view control needing no knowledge of how the referenced content is encoded;

requesting, by the view control in response to determining that the content referenced by the one reference is to be retrieved, the content referenced by the one reference from the multiple resolvers;

acquiring by the multiple resolvers, context that comprises information used by the multiple resolvers to decode the referenced content;

determining at least one of the multiple resolvers to decode the referenced content based, at least in part, on the context acquired; and     receiving, by the view control from the at least one of the multiple resolvers in response to the request, the referenced content after the referenced content has been decoded by the at least one of the multiple resolvers.

15. A computer-readable storage medium as recited in claim 14, the electronic document comprising a program, the content referenced by the one reference comprising a portion of the program, the referenced content having been decoded by being decrypted by the at least one of the multiple resolvers, and the acts further comprising running, by the view control, the program.

16. A computer-readable storage medium as recited in claim 14, the receiving comprising receiving the referenced content after the referenced content has been decoded by being decrypted by the at least one of the multiple resolvers.

17. A computer-readable storage medium as recited in claim 14, the receiving comprising receiving the referenced content after the referenced content has been personalized by the at least one of the multiple resolvers for a user of the computing device.

18. A computer-readable storage medium as recited in claim 14, the acts further comprising:

exposing an application programming interface to the application;

receiving an identifier of the electronic document from the application by the application invoking a method of the application programming interface; and     receiving an indication of the multiple resolvers from the application by the application invoking the method of the application programming interface.

19. A computing device comprising:

one or more processors; and computer-readable media having stored thereon multiple instructions that implement an application, a view control, and multiple resolvers and that, responsive to execution by the one or more processors, cause the one or more processors to perform acts comprising:

receiving, from the multiple resolvers by the view control from the application invoking a method of an application programming interface exposed by the view control, both an identifier of an electronic publication and at least one of the multiple resolvers for the electronic publication;

obtaining, by the view control from one of the multiple resolvers, the electronic publication, the electronic publication including one or more relative references to content to be displayed as part of the electronic publication;

determining, by the view control, that the content referenced by one of the one or more relative references is to be retrieved, the view control needing no knowledge of how the content referenced by the one or more relative references is encoded;

requesting, by the view control in response to determining that the content referenced by the one relative reference is to be retrieved, the content referenced by the one relative reference from the multiple resolvers;

acquiring, by the multiple resolvers, context that comprises information used by the multiple resolvers to decode the referenced content;

determining at least one of the multiple resolvers to decode the referenced content based, at least in part, on the context acquired;

receiving, by the view control from the at least one of the multiple resolvers in response to the request, the referenced content after the referenced content has been decrypted by the at least one of the multiple resolvers; and     displaying, by the view control, the referenced content.

20. computing device as recited in claim 19, the at least one of the multiple resolvers being one of multiple resolvers in the computing device, the identifier of the electronic publication and the at least one of the multiple resolvers for the electronic publication comprising a uniform resource indicator, and the acts further comprising:

determining, by the view control, one of the multiple resolvers to decode the referenced content by extracting the identifier of the at least one of the multiple resolvers from the uniform resource indicator.

\* \* \* \* \*